United States Patent
Kastner et al.

[19]

[11] Patent Number: 5,845,607
[45] Date of Patent: Dec. 8, 1998

[54] BIRD DETERRING DEVICE FOR PROTECTION OF A BODY OF WATER

[76] Inventors: Darryl Kastner, 155 Mount Reliant Pl SE, Calgary, Canada, AB T2Z 2G2; Herman Kastner, Box 597, Coaldale, Canada, AB T1M 1M5

[21] Appl. No.: 982,123

[22] Filed: Sep. 15, 1997

[51] Int. Cl.⁶ ................................................ A01K 29/00
[52] U.S. Cl. ............................................ 119/903; 52/101
[58] Field of Search ....................... 119/903; 43/1, 43/26.1, 58, 98, 131; 52/101; 256/23, 39

[56] References Cited

U.S. PATENT DOCUMENTS

| | | | |
|---|---|---|---|
| 2,114,945 | 4/1938 | Thomson | 43/1 |
| 2,142,371 | 1/1939 | Peles | 20/1 |
| 2,830,404 | 4/1958 | Manning | 47/1 |
| 3,148,417 | 9/1964 | Dellas | 20/1 |
| 4,100,706 | 7/1978 | White | 52/101 |
| 4,962,619 | 10/1990 | Chatten | 52/101 |
| 5,092,088 | 3/1992 | Way | 52/101 |
| 5,341,759 | 8/1994 | Hood | 114/255 |
| 5,406,907 | 4/1995 | Hart | 119/903 |
| 5,410,982 | 5/1995 | Mann | 114/343 |
| 5,451,239 | 9/1995 | Sewell | 47/1.01 |
| 5,454,183 | 10/1995 | Antonini | 43/1 |
| 5,588,251 | 12/1996 | Young | 43/119 |
| 5,713,160 | 2/1998 | Heron | 119/903 |

FOREIGN PATENT DOCUMENTS

| | | | |
|---|---|---|---|
| 12492 | 5/1933 | Australia | 43/58 |
| 2250172 | 6/1992 | United Kingdom . | |

*Primary Examiner*—Thomas Price
*Attorney, Agent, or Firm*—David S. Thompson

[57] ABSTRACT

A bird deterring device for protection of a reservoir or other body of water is disclosed. The deterring device provides an array of wires stretched across the reservoir, wherein adjacent wires are oriented in a parallel manner and are spaced apart by approximately 12 feet. Each wire is supported at a first end by an anchor rod driven into the ground of the shoreline defining the reservoir or body of water. Each wire is supported at a second end by an adjustment rod carrying a wire tightening mechanism which allows the wire to be tightened until taut. The wires reduce or eliminate use of the body of water by water birds by providing both visual and auditory deterrents. Wind, moving about the wires, creates a high-pitched whine that tends to annoy and repel birds. Additionally, birds tend to reject making a water landing due to the location of the wires, preferring instead to divert to other bodies of water.

5 Claims, 1 Drawing Sheet

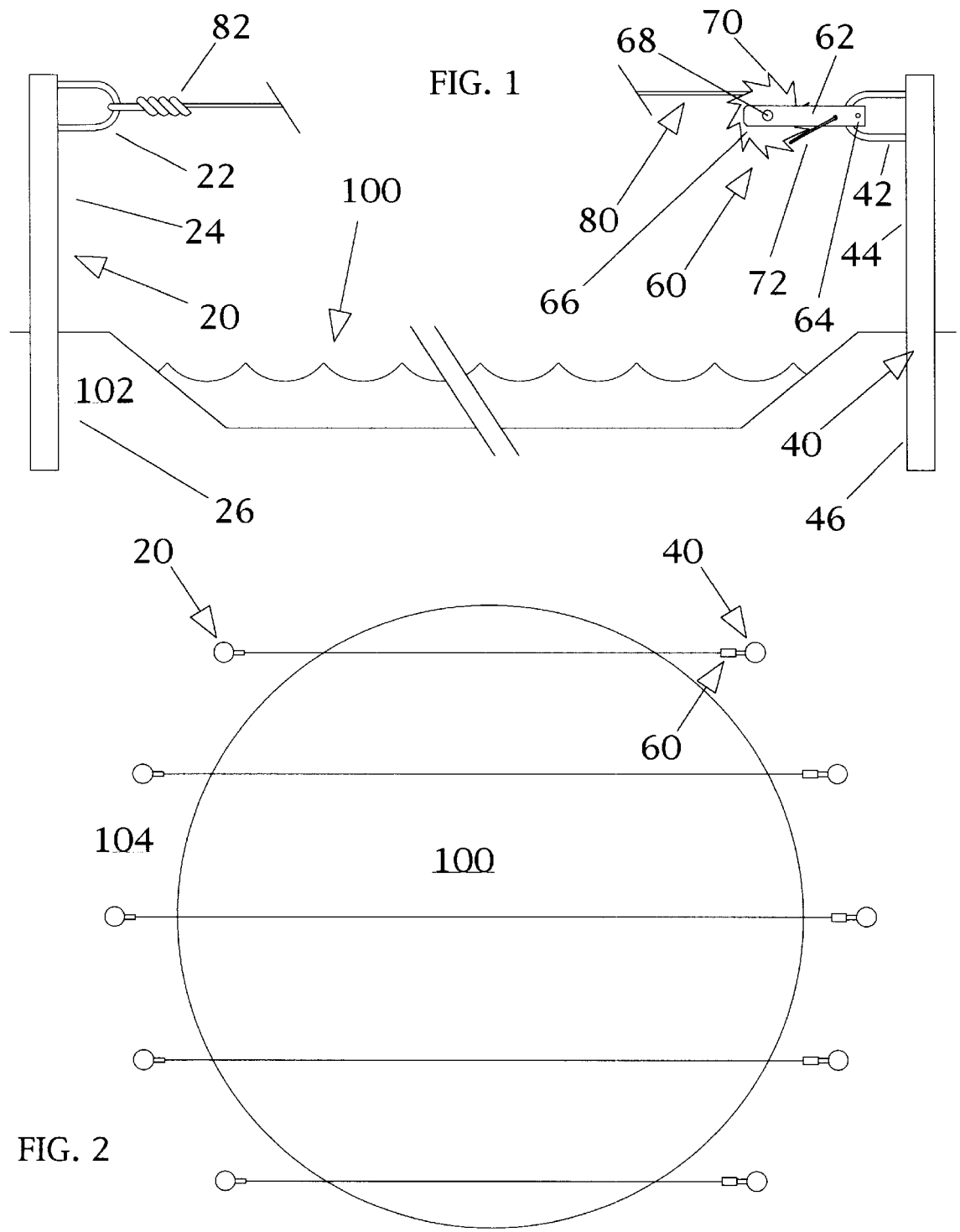

BIRD DETERRING DEVICE FOR PROTECTION OF A BODY OF WATER

CROSS-REFERENCES

There are no applications related to this application filed in this or any foreign country.

BACKGROUND

Many types of animal and bird deterring and repelling devices are well-known, and have prevented animals and birds from entering, or nesting upon, certain limited areas, such as building ledges, eaves and rafters, boats and other marine crafts.

Most bird deterring and repelling devices have employed nets or ropes to prevent or discourage birds from perching or nesting in limited areas, particularly on buildings and/or marine crafts. As a result, the design of the structure of most such devices has been directed to actually physically preventing the birds' access to some type of perching or nesting area.

Unfortunately, while some such devices are well-adapted to their intended use, they are very limited in scope, and are totally unadapted to the protection of large water bodies such as small lakes and fresh-water reservoirs. The protection of such water fresh bodies is important for health reasons, as many urban areas are dependent on them for drinking water supply. Additionally, fish hatcheries require protection, as birds will often swoop down and catch small fish, reducing a hatchery's output.

For the foregoing reasons, there is a need for an apparatus and method of use that can prevent birds from accessing and using water bodies being used for drinking water supply or for fish hatcheries.

SUMMARY

The present invention is directed to an apparatus and a method of use that satisfies the above needs.

The bird deterring apparatus for the protection of a reservoir, fish hatchery or other body of water of the present invention provides some or all of the following structures.

(A) At least two anchor rods, each anchor rod having a lower end carried by or embedded in the shoreline defining a reservoir, and having an upper end having a first fastener.

(B) A wire segment associated with each of the at least two anchor rods, each wire segment having first and second ends, the first end attached to the first fastener of the anchor rod. The wire segments associated with each anchor rod are arrayed in a substantially parallel manner over the surface of the water, and are typically separated by approximately 12 feet;

(C) One adjustment rod associated with each of the at least two anchor rods, each adjustment rod having a lower end carried by the shoreline, and having an upper end having a second fastener.

(D) A wire tightening device, carried by the second fastener of each adjustment rod, for attachment to the second end of the wire, and for adjusting the tension of the wire. In a preferred version of the invention, the wire tightening means includes a body portion carrying a wheel, the wheel having a number of barbs radially arrayed about a perimeter region of the wheel. The wire tightening device is typically operated by means of a lever which is adapted to pull on the barbs. A locking device engages the barbs, preventing unwanted counter rotation of the wheel.

It is therefore a primary advantage of the present invention to provide a novel bird deterring device and method for water body protection that is inexpensive to construct and which may be assembled or disassembled rapidly and easily.

Another advantage of the present invention is to provide a bird deterring device and method for water body protection that does no damage to the environment of, and adjacent to, the water body being protected, and which may later be removed leaving no scar or trace.

Another advantage of the present invention is to provide a bird deterring device and method for water body protection that provides both visual and auditory deterrents to birds that would otherwise use the reservoir.

A still further advantage of the present invention is to provide a bird deterring device and method for water body protection that is extremely effective in protecting a water body from fouling due to the presence of water birds.

DRAWINGS

These and other features, aspects, and advantages of the present invention will become better understood with regard to the following description, appended claims, and accompanying drawings where:

FIG. 1 is an isometric view of a version of the invention having an anchor rod with associated adjustment rod carrying a wire tightening mechanism and having a wire segment extending across a reservoir; and FIG. 2 is a plan view of a reservoir having a number of anchor rod and adjustment rod pairs, supporting wire segments across the reservoir.

DESCRIPTION

Referring in generally to FIGS. 1 and 2, a bird deterring device for water body protection constructed in accordance with the principles of the invention is seen. A plurality of anchor rods 20 are supported in the ground of the shoreline adjacent to and defining a reservoir 100. Each anchor rod is associated in a one-to-one manner with an adjustment rod 40. Each adjustment rod carries a wire tightening mechanism 60, which allows a wire segment 80 to be carried in a taut manner across the reservoir 100, between the anchor rod and associated adjustment rod. A plurality of such anchor rod and adjustment rod pairs, having a stretched wire segment carried between them, are distributed in an array over a reservoir, fish hatchery or other water body in a manner that results in parallel wires spaced approximately 12 feet apart covering the entire reservoir.

Each anchor rod 20 provides an upper end 24 having a fastener such as loop 22 and a lower end 26, which is suitable for burial in the ground 102 of the shoreline 104 defining the perimeter of the reservoir 100 or small lake. The overall length of the anchor rod is typically 6 or more feet, with approximately 3 to 6 feet buried beneath the ground. In a typical application, approximately 2 feet of the anchor rod extends above ground, thereby minimizing the tendency of the anchor rod to bend under the tension of the wire segment. The anchor rod is typically a solid steel cylinder having a diameter of approximately ¾" to 1". In a preferred embodiment, the anchor rod is of a type widely known in the oil industry as a "sucker rod".

Each anchor rod 20 is associated with an adjustment rod 40 in a one-to-one manner. Each adjustment rod provides an upper end 44 having a fastener such as loop 42 and a lower end 46, which is suitable for burial in the ground 102 of the shoreline 104 defining the perimeter of the reservoir 100 or small lake. The construction of the adjustment rods is similar to the construction of the anchor rods. The overall length of the adjustment rod is typically 6 or more feet, with approximately 3 to 6 feet buried beneath the ground. In a typical application, approximately 2 feet of the anchor rod extends above ground, thereby minimizing the tendency of the anchor rod to bend under the tension of the wire segment. The adjustment rod is typically a solid cylinder having a diameter of approximately ¾" to 1". In a preferred embodiment, the anchor rod is of a type widely known in the oil industry as a "sucker rod".

A wire segment 80 is high tensile wire, and is typically available commercially in 1000 meter lengths. The wire is fastened at a first end to the fastening loop 22 of the anchor rod 20 by a wrapped tie 82.

A wire tightening mechanism 60 is of a known type of wire tightening device, typically used to tighten sheep fencing, and often known as an "in-line strainer". A typical wire tightening mechanism provides a body 62 defining a rear fastening hole carrying a bolt 64, for attachment to the loop 42 or other fastener carried by the adjustment rod 40. A wheel 66 revolves about an axle 68 carried by the body 62. The wheel carries a number of radially distributed barbs 70 which allow a lever tool to engage and rotate the wheel. A lock 72 prevents undesired counter-rotation of the wheel.

To use the bird deterring device to protect a reservoir or other body of water, a number of anchor rod 20 and adjustment rod 40 pairs are installed in the ground of the shoreline defining the perimeter of the reservoir, fish hatchery or other body of water. The anchor rods and adjustment rods should be positioned so that wire segments extending between the elements of each pair are arrayed in parallel, and are typically separated by a distance of approximately 12 feet.

Wire segments 80 are then stretched between each anchor rod and associated adjustment rod. The slack is removed from each wire segment by use of the wire tightening mechanism 60 carried by each adjustment rod.

The bird deterring device is effective for two principle reasons. The wire segments provide a visual deterrent to water birds, tending to prevent them from landing. Secondly, even slight wind, passing over the wires, tends to produce a high-pitched whine that provides an auditory deterrent to the birds.

The previously described versions of the present invention have many advantages, including a primary advantage of providing a novel bird deterring device and method for water body protection that is inexpensive to construct and which may be assembled or disassembled rapidly and easily.

Another advantage of the present invention is to provide a bird deterring device and method for water body protection that does no damage to the environment of, and adjacent to, the water body being protected, and which may later be removed leaving no scar or trace.

Another advantage of the present invention is to provide a bird deterring device and method for water body protection that provides both visual and auditory deterrents to birds that would otherwise use the reservoir.

A still further advantage of the present invention is to provide a bird deterring device and method for water body protection that is extremely effective in protecting a water body from fouling due to the presence of water birds.

Although the present invention has been described in considerable detail and with reference to certain preferred versions, other versions are possible. For example, the specific structure of the anchor rod, the adjustment rod and the wire tightening mechanism is somewhat variable, while still in keeping within the teachings of the invention, which are more particularly directed to the creation of an array of parallel wires stretched across a reservoir. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A bird deterring device for protecting a body of water defined within a shoreline from use by birds by producing both visual and auditory deterrents, the bird deterring device comprising:

(A) at least two anchor rods, each anchor rod having a lower end carried by the shoreline, and having an upper end having a first fastener;

(B) a wire segment associated with each of the at least two anchor rods, each wire segment having an elongate middle portion, extended over the body of water, the elongate middle portion terminating in a first end and a second end, the elongate middle portion exposed to the movement of air, wherein the elongate middle portion is free from any supported objects which might damp vibration of the elongate middle portion, and therefore damp an acoustic output of the elongate middle portion, the first end attached to the first fastener of the anchor rod;

(C) one adjustment rod is associated with each of the at least two anchor rods, each adjustment rod having a lower end carried by the shoreline, and having an upper end having a second fastener; and (D) wire tightening means, carried by the second fastener of each adjustment rod, for attachment to the second end of the wire, and for adjusting the tension of the wire.

2. The bird deterring device of claim 1, wherein the wire tightening means comprises:

(a) a body portion;

(b) a wheel, rotatably carried by the body portion; and (c) a plurality of barbs, radially arrayed about a perimeter region of the wheel.

3. The bird deterring device of claim 1, wherein the wire segments associated with each anchor rod are arrayed in a substantially parallel manner.

4. The bird deterring device of claim 3, wherein the wire segments associated with each anchor rod are separated by approximately 12 feet.

5. A bird deterring device for protecting a body of water defined within a shoreline from use by birds by producing both visual and auditory deterrents, the bird deterring device comprising:

(A) at least two anchor rods, each anchor rod having a lower end carried by the shoreline, and having an upper end having a first fastener;

(B) a wire segment associated with each of the at least two anchor rods, each wire segment having an elongate middle portion, extended over the body of water, the elongate middle portion terminating in a first end and a second end, the elongate middle portion exposed to the movement of air, wherein the elongate middle portion is free from any supported objects which might damp vibration of the elongate middle portion, and therefore damp an acoustic output of the elongate middle portion, the first end attached to the first fastener of the anchor rod, wherein the wire segments associated with each anchor rod are arrayed in a substantially parallel manner, and are separated by approximately 12 feet;

(C) one adjustment rod associated with each of the at least two anchor rods, each adjustment rod having a lower end carried by the shoreline, and having an upper end having a second fastener; and (D) wire tightening means, carried by the second fastener of each adjustment rod, for attachment to the second end of the wire, and for adjusting the tension of the wire, the wire tightening means comprising:

(a) a body portion;

(b) a wheel, rotatably carried by the body portion; and (c) a plurality of barbs, radially arrayed about a perimeter region of the wheel.

\* \* \* \* \*